United States Patent Office 3,440,169
Patented Apr. 22, 1969

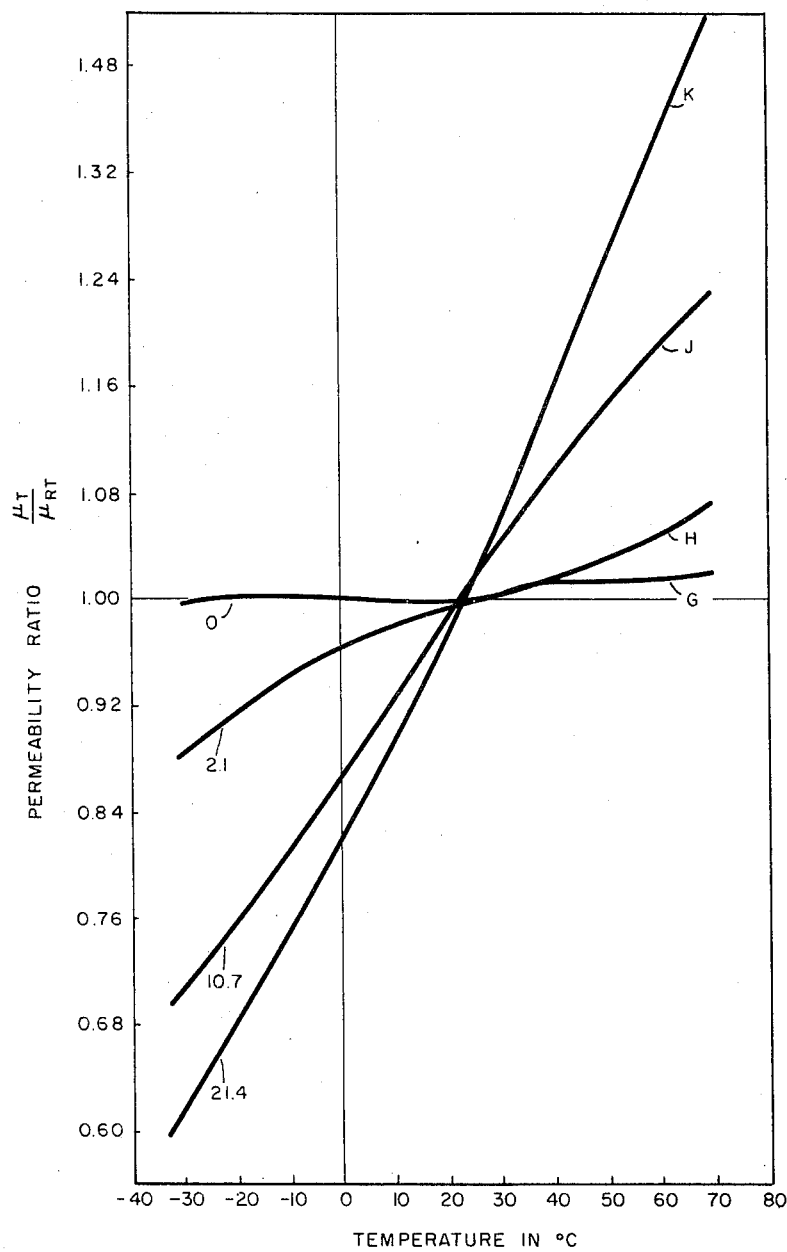

3,440,169
CADMIUM-SUBSTITUTED FERRITE MATERIALS
Donald H. Baird, Great Neck, and Samuel Natansohn, Massapequa Park, N.Y., assignors to General Telephone and Electronics Laboratories, Inc., a corporation of Delaware
Filed Dec. 3, 1965, Ser. No. 511,921
Int. Cl. C04b 35/36; H01f 1/10
U.S. Cl. 252—62.62
10 Claims

ABSTRACT OF THE DISCLOSURE

A cadmium-containing manganese zinc ferrite having a $\mu Q$ product in excess of 100,000 is provided. The presence of cadmium in the ferrite causes the permeability vs. temperature dependence of the ferrite to assume a more linear slope, and the magnitude of the slope increases as the ratio of cadmium to zinc in the ferrite increases.

---

This invention relates to ferrite materials and in particular to ferrite compositions suitable for use as cores in inductors operating at telecommunications frequencies up to 200 kilocycles per second.

Communications systems frequently include apparatus containing temperature-compensated frequency filters employing ferrite inductor cores. It is desirable that the ferrite material used in these inductors have a high permeability (over 1,000) and a Q sufficiently high that the product of the Q and permeability exceed $10^5$ at 100 kilocycles per second. Further, the permeability of the material should increase monotonically with increasing temperature and the permeability-temperature function should be as linear as possible. For inductor cores used in temperature-compensated filters, the slope of the permeability-temperature curve is preferably linear and positive over a temperature range of $-30°$ C. to $+70°$ C.

The materials conventionally used for such application are manganese zinc ferrites. These materials generally have low losses and a permeability which is high and reasonably stable with changes in temperature. However, the requirement of a positive and linear variation in permeability with changes in temperature is difficult to meet in the manganese zinc ferrite system. The permeability-temperature function is very sensitive to stoichiometric variations in this system and it assumes irregular slopes in the composition ranges where high permeabilities are attainable.

Accordingly, it is an object of our invention to provide a novel ferrite composition and method of preparing it which exhibits a monotonic increase in permeability with increasing temperature over a temperature range of $-30°$ C. to $+70°$ C.

Another object of our invention is to provide a high permeability ferrite.

Still another object is to provide a method of synthesizing a high permeability ferrite which permits control of the slope of the permeability-temperature curve.

Yet another object is to provide a high permeability ferrite which may be synthesized at lower sintering temperatures than conventional manganese zinc ferrites.

In accordance with our invention, ferrites of the manganese zinc type are provided in which all or part of the zinc is replaced by cadmium. The cadmium substitution is made in ferrite materials which consist essentially of 50-56 mole percent $Fe_2O_3$, 16-35 mole percent MnO and 14-30 mole percent ZnO. These ferrites may be described by the empirical formula:

$$(w)Fe_2O_3 + (x)CdO + (y)ZnO + (z)MnO$$

where $50 \leq w \leq 56$, $0.8 \leq x \leq 21.4$, $0 \leq y \leq 21.4$, $16 \leq z \leq 35$ and $w+x+y+z=100$, all numerical values being expressed in mole percent.

The substitution of cadmium for zinc does not alter the basic magnetic properties of the ferrite since the cadmium is analogous to the zinc ion in showing a marked preference for the tetrahedral sites in the spinel structure. However the cadmium substitution does materially affect the slope of the permeability vs. temperature curve. As shall be shown hereinafter, the curves of permeability vs. temperature tend to assume a more linear slope and the magnitude of their slope increases as the ratio of cadmium to zinc in the ferrite increases.

The substitution of small amounts of cadmium for zinc also tends to increase the product of permeability $\mu$ and Q as compared with these values for unsubstituted manganese zinc ferrite. In this ferrite system, compositions in which cadmium has been substituted for zinc have comparable permeabilities and higher Q's than systems which do not contain cadmium. The higher optimum values of the $\mu Q$ product for the cadmium-containing materials is due to a high Q rather than high permeability while the reverse is true for manganese-zinc ferrites which do not contain cadmium. This is significant in the manufacture of inductor ferrites. Given two materials with the same $\mu Q$ product, it is preferable to use one with lower permeability and higher Q since lower permeabilities extend the upper frequency limit of usefulness of the inductor.

The incorporation of cadmium oxide in the manganese zinc formulation has an additional beneficial effect in that it permits the preparation of well-sintered ferrite pieces at temperatures substantially lower than those required for the sintering of the unsubstituted ferrites. While the reason for this is not fully understood it is believed that, since cadmium oxide melts at a considerably lower temperature than does zinc oxide, the mobility of the cadmium ion is greater than that of the zinc ion. Thus, sintering, which proceeds by a diffusion mechanism, is promoted by the increased mobility of the cadmium ion.

The ferrites of the present invention are prepared by mixing suitable compounds of the metallic elements (such as oxides of the constituent metals or salts which upon heating decompose to form oxides) and then subjecting the mixture to one or more calcining operations with intermediate pulverizing. After the final calcining the material is mixed with the addition of a binder and/or plasticizing agents. The resulting mix is molded under pressure in a die in the desired shape, the compacts sintered in a gas-tight tube furnace under controlled temperature and atmosphere and then cooled in a protective atmosphere.

The above objects of and the brief introduction to the present invention will be more fully understood and further objects and advantages will become apparent from a study of the following description in connection with the drawing which is a graph showing the relationship between permeability and temperature for several ferrite compositions made in accordance with our invention.

A number of ferrite compositions were prepared and the effect of cadmium substitution for zinc on the properties of the ferrites determined.

Table II summarizes some of the properties of the formulated materials as a function of sintering temperature.

TABLE II

| Composition: | x in (16.1−x)ZnO mole percent | Sinter. Temp. °C. | Density, g./cm.³ | $\mu$ [1] | Q [1] | $\mu$Q [1] product |
|---|---|---|---|---|---|---|
| A-I | 0.0 | 1,250 | 4.85 | 2,120 | 59.6 | 126,000 |
| A-II | 0.0 | 1,225 | 4.77 | 1,870 | 64.2 | 120,000 |
| A-III | 0.0 | 1,200 | 4.76 | 1,570 | 71.1 | 112,000 |
| B-I | 0.8 | 1,250 | 4.85 | 1,970 | 61.0 | 120,000 |
| B-II | 0.8 | 1,225 | 4.82 | 1,920 | 72.0 | 138,000 |
| B-III | 0.8 | 1,200 | 4.78 | 1,660 | 77.9 | 129,000 |
| C-I | 1.6 | 1,250 | 4.81 | 1,850 | 66.2 | 123,000 |
| C-II | 1.6 | 1,225 | 4.80 | 1,700 | 76.1 | 130,000 |
| C-III | 1.6 | 1,200 | 4.74 | 1,540 | 84.9 | 131,000 |

[1] Measured at 100 kc.

EXAMPLE I 329.62 grams of ferric oxide and 157.40 grams of manganous carbonate were first dry mixed thoroughly by tumbling and then were blended as an aqueous slurry in a high speed mixer for a short time. The slurry was then filtered, the filter-cake dried thoroughly, pulverized and sieved. To 48.70 grams of this mixture there was added zinc oxide and cadmium oxide in the quantities given in Table I to form compositions having the empirical formula $$51.6\ Fe_2O_3 + x\ CdO + (16.1-x)\ ZnO + 32.3\ MnO$$

where $x$ has values between 0 and 16.1.

TABLE 1

| Composition: | x in (16.1−x)ZnO mole percent | ZnO, grams | CdO, grams |
|---|---|---|---|
| A | 0.0 | 5.24 | 0.00 |
| B | 0.8 | 4.98 | 0.41 |
| C | 1.6 | 4.72 | 0.83 |
| D | 3.2 | 4.19 | 1.65 |
| E | 8.0 | 2.62 | 4.13 |
| F | 16.1 | 0.00 | 8.27 |

Each batch was then blended in a high speed mixer, the slurry filtered, the filter-cake dried, pulverized, passed through a No. 30 screen (U.S. Standard Sieve Series) and calcined at a temperature of 900° C. for 4 hours. After calcination the material was crushed in a mortar to pass through the No. 30 screen and blended once again with the addition of 7 to 10% of an organic binder such as Hyform 1214, a hydrocarbon wax emulsion made by the American Cyanamid Company. The material was then granulated by forcing the semi-dry filter cake through a No. 30 screen. After drying, the material was pressed in steel dies at 20,000 to 25,000 pounds per square inch pressure to form toroids of the desired size and shape.

The pressed samples were next heated slowly in air to a temperature of about 800° C. to volatilize the organic binder and were then sintered in a tube furnace under controlled conditions of temperature and atmosphere. The optimum sintering temperature was found to be in the range 1,200° C.–1,250° C. and the optimum sintering period between 4 and 5 hours. The furnace atmosphere during sintering consists of a gas mixture of several percent oxygen admixed with nitrogen while the atmosphere during the cooling part of the heat cycle contained considerably less oxygen. Best results have been obtained when the compositions are sintered in 3.0% $O_2$—97% $N_2$ or in 6.0% $O_2$—94% $N_2$ gas mixtures. The most effective cooling atmosphere was found to be a 0.1% $O_2$— 99.9% $N_2$ gas mixture, the cooling step proceeding at a natural rate in the furnace.

As shown, the highest $\mu$Q product achievable in the prior art cadmium-less composition is obtained at a sintering temperature of 1,250° C., the $\mu$Q product decreasing with decreasing sintering temperature. In the case of cadmium-substituted manganese zinc ferrites it is possible to attain high $\mu$Q products at significantly lower sintering temperatures than in pure zinc-manganese ferrites. It is evident from the data that a decrease in sintering temperature is accompanied by an increase in the value of Q, the quality factor of the material. In the substituted materials the high $\mu$Q product is a result of lower permeability and higher Q, an advantageous feature, for the lower permeability extends the upper frequency range at which the ferrite is useful as an inductor core. Further, the highest $\mu$Q product obtainable with the cadmium substituted ferrite is greater than that obtainable with the unsubstituted material. In addition, the slopes of the permeability-temperature curves of the cadmium-containing compositions given in Table I are positive over the entire temperature range −30° C. to +70° C.

EXAMPLE II

A series of ferrite cores were made by the method of Example I except this time the amounts of the constituents were modified to produce ferrites having the empirical formula $$51.9\ Fe_2O_3 + xCdO + (21.4-x)\ ZnO + 26.7\ MnO$$

where x has values between 0 and 21.4.

In this system the substitution of cadmium for zinc changes the irregular dependence of permeability on temperature observed in the unsubstituted manganese zinc ferrite to one which has a positive slope throughout the range of interest. In the figure curves G, H, J, and K are plots of the permeability ratio $\mu_T/\mu_{RT}$, where $\mu_T$ is the permeability at the measured temperature and $\mu_{RT}$ is the permeability at room temperature, over a temperature range of −30° C. to +70° C. for samples in which $x$ equals 0.0, 2.1, 10.7 and 21.4 respectively. It is clear from the figure that with an increasing amount of cadmium-for-zinc substitution, the curves tend to assume a linear shape and the magnitude of their slope increases.

As has been stated, the incorporation of cadmium in the ferrite composition lowers the sintering temperature required to obtain well-sintered samples. This effect is demonstrated by the data of Table III which gives density and permeability values for materials of the stated compositions.

TABLE III

| Composition | x in (21.4−x)ZnO mole percent | Sinter. Temp., °C. | Density, g./cm.³ | Permeability |
|---|---|---|---|---|
| G-I | 0.0 | 1,350 | 4.76 | 910 |
| G-II | 0.0 | 1,300 | 4.66 | 600 |
| H-I | 2.1 | 1,300 | 4.85 | 1,770 |
| J-I | 10.7 | 1,300 | 4.84 | 1,300 |
| K-I | 21.4 | 1,300 | 4.78 | 540 |
| H-II | 2.1 | 1,250 | 4.78 | 1,570 |
| J-II | 10.7 | 1,250 | 4.86 | 1,230 |
| K-II | 21.4 | 1,250 | 4.85 | 860 |
| J-III | 10.7 | 1,200 | 4.92 | 1,100 |
| K-III | 21.4 | 1,200 | 5.05 | 1,030 |

All of the samples were prepared by identical methods, the only variables being the cadmium content and the sintering temperature. The data show that the cadmium-containing compositions have substantially higher densities than the unsubstituted manganese-zinc ferrite. Thus, the substitution of cadmium for only one tenth of the molar content of zinc ($x=2.1$) converts a material which has a rather low density and permeability when sintered at 1,350° C. to one of comparable density and much higher permeability when sintered at a temperature 100° C. lower. The density of the samples increases with increasing cadmium content of the composition while the temperature required to obtain well-sintered pieces decreases, another indication that cadmium promotes the sintering of ferrite cores. It shall be noted that in the samples of cadmium manganese ferrites (K-I, K-II and K-III) one observes a decrease in the permeability with increasing sintering temperature. It is believed that this is due to the volatilization of cadmium from the material at the higher sintering temperature with a resulting change in the stoichiometry of the substance.

Summarizing, the substitution of cadmium for zinc in manganese zinc ferrites affects the permeability vs. temperature dependence in the direction of more linear curves and steeper more positive slopes. It permits the preparation of materials having desirable permeability-temperature variations from compositions which, when unsubstituted, exhibit irregular temperature characteristics. Thus the number of materials for which this parameter is a reasonably linear function of position slope is greatly increased. It is also possible to vary the slope of the permeability-temperature curve of a particular composition just by varying the cadmium content of the material. In addition, the incorporation of cadmium in the formulation facilitates greatly the sintering process which permits the preparation of well-sintered, high permeability ferrites at relatively low temperatures. The preparation of high-permeability ferrites at lower temperatures leads to higher $\mu Q$ products, for ferrite losses generally decrease with decreasing processing temperature.

As many changes could be made in the above described compositions and method and many different materials could be made without departing from the scope thereof, it is intended that all matter contained in the above description or shown in the accompanying graph shall be interpreted as illustrative and not in a limiting sense.

What is claimed is:

1. A ferrite material having a permeability which increases monotonically with increases in temperature over a temperature range −30° C. to +70° C. and which has a $\mu Q$ product in excess of 100,000 consisting essentially of a composition defined by the approximate formula $$w\ Fe_2O_3 + xCdO + yZnO + zMno$$

wherein $50 \leq w \leq 56$, $0.8 \leq x \leq 21.4$, $0 \leq y \leq 21.4$, $16 \leq z \leq 35$ and $w+x+y+z$ equals 100, all numerical values being expressed in mole percent.

2. A ferrite material as defined by claim 1 wherein $y$ has a value equal to $(16.1-x)$ mole percent and $x$ is between 0.8 and 16.1 mole percent.

3. A ferrite material as defined by claim 1 wherein $y$ has a value equal to $(21.4-x)$ mole percent and $x$ is between 2.1 and 21.4 mole percent.

4. A ferrite material as defined by claim 1 wherein $w$ is equal to approximately 51.6 mole percent, $x$ has a value between 0.8 and 16.1 mole percent, $y$ is equal to $(16.1-x)$ mole percent and $z$ is equal to approximately 32.3 mole percent.

5. A ferrite material as defined by claim 1 wherein $w$ is equal to approximately 51.9 mole percent, $x$ has a value between 2.1 and 21.4 mole percent, $y$ is equal to $(21.4-x)$ mole percent and $z$ is equal to approximately 26.7 mole percent.

6. A ferrite material as defined by claim 1 wherein $w$, $x$, $y$ and $z$ have the followinng approximate values in mole percent: $w=51.9$, $x=2.1$, $y=19.3$ and $z=26.7$.

7. A method of producing a ferrite material having a permeability which increases monotonically with increases in temperature over a temperature range −30° C. to +70° C. and which has a $\mu Q$ product in excess of 100,000 having the formula $w\ Fe_2O_3 + xCdO + yZnO + zMnO$ wtherein $50 \leq w \leq 56$, $0.8 \leq x \leq 21.4$, $0 \leq y \leq 21.4$, $16 \leq z \leq 35$, and $w+x+y+z=100$, all of said amounts being expressed in mole percent, said method comprising the steps of:
  (a) mixing the oxides of Fe, Cd, Zn and Mn in proportion such that the ferrite composition produced by firing has the above approximate formula,
  (b) molding said mixture into a compact having the desired shape,
  (c) sintering said compact in an oxygen-nitrogen atmosphere at a temperature in the range 1,200° C. to 1,300° C., and
  (d) cooling the sintered compact in an oxygen-nitrogen atmosphere having substantially less oxygen therein than the atmosphere employed during sintering.

8. The method of producing a ferrite material as defined by claim 7 wherein said compact was sintered at a temperature in the range 1,200° C. to 1,250° C. for 4 to 5 hours in an atmosphere consisting essentially of 3 to 6 percent oxygen and 94 to 97 percent nitrogen.

9. The method of producing a ferrite material as defined by claim 7 wherein said sintered compact was cooled in an atmosphere consisting essentially of approximately 0.1 percent oxygen and 99.9 percent nitrogen.

10. The method of producing a ferrite material as defined by claim 7 wherein said compact was sintered at a temperature in the range 1,200° C. to 1,250° C. for 4 to 5 hours in an atmosphere consisting essentially of 3 to 6 percent oxygen and 94 to 97 percent nitrogen and said sintered compact was cooled in an atmosphere consisting essentially of approximately 0.1 percent oxygen and 99.9 percent nitrogen.

References Cited

UNITED STATES PATENTS 2,551,711   5/1951   Snoek et al. _____ 252—62.62
3,027,327   3/1962   Blank _____ 252—6.62

FOREIGN PATENTS 149,710   1/1953   Australia.

TOBIAS E. LEVOW, Primary Examiner.

R. D. EDMONDS, Assistant Examiner.